(Model.)
E. J. FRASER.
Galvanic Belt.
No. 235,224.     Patented Dec. 7, 1880.
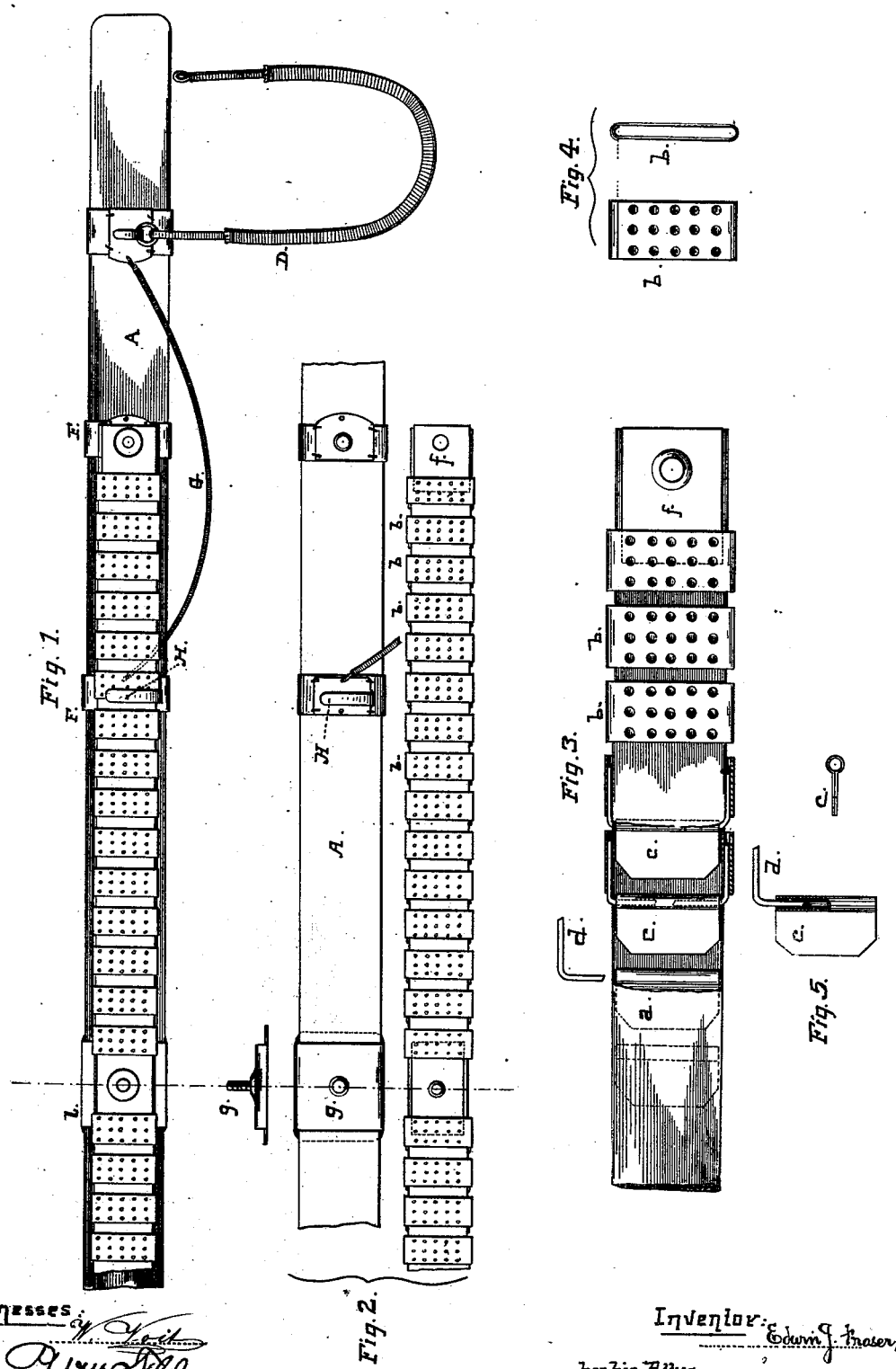

UNITED STATES PATENT OFFICE.

EDWIN J. FRASER, OF SAN FRANCISCO, CALIFORNIA.

GALVANIC BELT.

SPECIFICATION forming part of Letters Patent No. 235,224, dated December 7, 1880.

Application filed August 14, 1880. (Model.)

*To all whom it may concern:*

Be it known that I, EDWIN J. FRASER, of the city and county of San Francisco, in the State of California, have invented an Improved Galvanic Belt; and I do hereby declare that the following is a full, clear, and exact description thereof, reference being had to the accompanying drawings.

My invention relates to a new and improved galvanic belt for therapeutic uses, which I call the "duplex galvanic belt."

It consists, mainly, of a duplex series of galvanic pairs or batteries attached to an independent belt or band, so that the belt or band to which they are attached can be adjustably attached to the main belt, which passes around the waist of the wearer, the object being to permit the batteries to be shifted on the main belt to accommodate different sizes of waist. In the present instance I have represented the belt or band to which the elements of the battery are attached as forming the absorbent part of the battery while the dissimilar metals are attached to it.

My invention also includes several important improvements in the attachments for conducting and applying the galvanic current, all as hereinafter more fully described.

Referring to the accompanying drawings, Figure 1 is view of one-half of the belt. Fig. 2 shows the band and the tube with its plates detached from each other. Fig. 3 is an enlarged view, showing the manner of putting together the tube and the plate. Fig. 4 is a detail view of one of the copper plates. Fig. 5 shows construction of the inner zinc plate.

A is a belt or waistband, which I will ordinarily make of elastic webbing. To this belt I attach a duplex series of galvanic pairs or small batteries, B B, by means of clasps or loops F F, which are attached to the batteries at suitable points, but which can slide along the belt A, in order to adjust the batteries to the size of the waist around which the belt is to be applied. Metallic connection is made between the batteries and the electrodes D by means of the insulated metallic cords G G. These two series of batteries, when connected together by the cords, produce opposite currents, and when joined together at their positive ends the point of juncture is properly called the "positive middle," and when joined together at their negative ends the point of juncture is termed the "negative middle."

Each series of batteries is constructed of a flat hollow tube, of cloth or other absorbent material, $a$, over or around which flat copper bands $b$ are placed, while the zinc plates $c$ are inserted inside the hollow cloth tube, so as to lie partly inside the copper band, with the cloth of the tube interposed between them on all sides. I then use a bent wire, $d$, for connecting the zinc and copper plates of each element through the interposing cloth or tube.

The zinc plates which I use consist of a strip of zinc bent upon itself, and having a tubular passage at the bend, as shown at Figs. 3 and 5.

To put the belt together I slip a copper ring, $b$, over the flat tube $a$ to near its middle. A zinc, $c$, is then inserted into the end of the tube $a$, point first, and pushed through it until its point enters the copper ring $b$, with a thickness of cloth interposed between it and the copper on all sides. An angle of wire, $d$, is then pushed through the cloth on each side of the tube into the opening where the zinc is folded, while the other arm of the angle is brought up alongside the edge of the tube $a$. Another copper ring, $b$, is then put on the tube $a$, close to the projection caused by the zinc, so as to inclose the tube $a$, and the two angular wires previously inserted coming in metallic contact with the latter forms a metallic connection between the zinc and copper. Another zinc, $c$, is then pushed into the tube, like the first, then angles $d$, then copper $b$, and so on till one side is completed, after which a zinc strip, $f$, is put over the end of the tube $a$ and passed under the last copper $b$ on each side and fastened in place.

The other series of the batteries is made like the one just described; but a sheet of copper, $e$, is introduced under the copper on each side. When the duplex series is completed the two negative ends are perforated, as well as the positive middle, for the purpose of fastening them to the screw-plates on the loops.

The spiral electrode $l$ is made by making a loop or ring to encircle the elastic web A. This loop is provided with a screw, $g$, to pass through the positive middle of the duplex series.

The perineal electrode D is simply a metallic cord well covered with absorbent material, which is wet with water when in use. This electrode is applicable to men only, and is applied by being passed around behind the testicles and in close contact with the perinæum. For females I use a plate similar to the positive electrode C, already described.

The metallic cords E E are for the purpose of maintaining a metallic connection in the circuit, while the loops are adjusted on the web A to suit the size of the wearer.

To regulate the intensity of the current by increasing or diminishing the number of galvanic pairs, I employ the metallic hook or clamp H, attached to the sliding loop. If the full strength of the duplex series is desired the clamps are placed at the zinc extremities; but if the action of a single cell is desired the hooks or clamps are moved back near the center or back electrode sufficiently to have a single pair between them.

Having thus described my invention, what I claim, and desire to secure by Letters Patent, is—

1. A galvanic belt for therapeutic purposes, consisting of a flat absorbent tube, $a$, having the copper bands $b$ placed around it, and the zinc plates $c$, placed inside of it, the zinc and copper plates being connected by wires $d$, which pass through the absorbent tube, said belt having clasps or loops F attached to it, whereby it can be adjustably secured upon a belt or waistband, A, substantially as described.

2. A galvanic battery consisting of a flat absorbent tube, $a$, having plates of dissimilar metal placed alternately inside and outside of it, and connected by wires passing through the tube, substantially as described.

3. A galvanic battery consisting of a flat absorbent tube, $a$, having flat copper bands $b$ placed around it, and zincs $c$, which are formed by bending a zinc plate upon itself, so as to form a loop at one end placed inside of it, said zincs being connected with the copper bands by angular wires $d$, one angle of which passes through the absorbent tube and enters the loop in the zinc plate, while the other angle passes under the copper band, substantially as specified.

4. The metallic hook or clamp H, attached to the adjustable loops F, and having metallic conductors attached to it, in combination with the independent battery-belt, which is composed of a number of elements or pairs, whereby any number of elements can be thrown into the circuit to regulate the intensity of the current, substantially as described.

5. The herein-described galvanic belt, consisting of the independent girdle or belt A, the duplex series of voltaic pairs B B, the adjustable loops F F, the metallic connecting-cords G G, and the positive and negative electrodes $l$ and D, all constructed and applied substantially as described, and for the purpose set forth.

In witness whereof I have hereunto set my hand.

EDWIN J. FRASER.

Attest:
EDWARD E. OSBORN,
WM. F. CLARK.